United States Patent
Sigmund et al.

(10) Patent No.: US 8,534,409 B2
(45) Date of Patent: Sep. 17, 2013

(54) DRIVETRAIN FOR A VEHICLE AND METHOD OF CONTROLLING SAME

(75) Inventors: Joshua D. Sigmund, Hilliard, OH (US);
Darren F. Stursa, Galloway, OH (US);
Aaron R. Alexander, Sunbury, OH (US)

(73) Assignee: Honda Motor Co., Ltd., Tokyo (JP)

( * ) Notice: Subject to any disclaimer, the term of this patent is extended or adjusted under 35 U.S.C. 154(b) by 385 days.

(21) Appl. No.: 12/847,695

(22) Filed: Jul. 30, 2010

(65) Prior Publication Data

US 2012/0024614 A1    Feb. 2, 2012

(51) Int. Cl.
*B60K 17/354*    (2006.01)

(52) U.S. Cl.
USPC ........................................... 180/247

(58) Field of Classification Search
USPC ................................. 180/233, 247
See application file for complete search history.

(56) References Cited

U.S. PATENT DOCUMENTS

| | | | |
|---|---|---|---|
| 2,730,914 A | 1/1956 | Rockwell | |
| 4,601,359 A | 7/1986 | Weismann et al. | |
| 4,630,704 A | 12/1986 | Yamakawa et al. | |
| 4,768,609 A | 9/1988 | Taga et al. | |
| 4,955,848 A | 9/1990 | Kotajima | |
| 4,974,473 A | 12/1990 | Hatakeyama | |
| 5,020,626 A | 6/1991 | Kodama | |
| 5,054,335 A | 10/1991 | Andrews | |
| 5,056,614 A | 10/1991 | Tokushima et al. | |
| 5,058,700 A * | 10/1991 | Shibahata ..................... | 180/245 |
| 5,119,900 A * | 6/1992 | Watanabe et al. ............. | 180/245 |
| 5,135,071 A | 8/1992 | Shibahata et al. | |
| 5,141,072 A * | 8/1992 | Shibahata ..................... | 180/245 |
| 5,353,889 A * | 10/1994 | Hamada ........................ | 180/242 |
| 5,411,110 A | 5/1995 | Wilson et al. | |
| 5,456,641 A * | 10/1995 | Sawase ........................... | 475/86 |
| 5,669,850 A | 9/1997 | Dourra et al. | |
| 5,728,022 A | 3/1998 | Schultz | |
| 5,924,952 A | 7/1999 | Bowen | |
| 5,989,146 A | 11/1999 | Brown et al. | |
| 6,042,504 A | 3/2000 | Gualtieri et al. | |
| 6,056,666 A | 5/2000 | Williams | |
| 6,064,934 A | 5/2000 | Zhang | |
| 6,086,515 A | 7/2000 | Buschmann et al. | |
| 6,095,276 A | 8/2000 | Kuroda et al. | |
| 6,105,703 A | 8/2000 | Kuroda et al. | |
| 6,213,242 B1 | 4/2001 | Rodrigues et al. | |
| 6,251,045 B1 | 6/2001 | Oliveira et al. | |
| 6,257,082 B1 | 7/2001 | Ore | |
| 6,549,840 B1 | 4/2003 | Mikami et al. | |
| 6,579,208 B2 | 6/2003 | Oliveira et al. | |
| 6,697,725 B1 | 2/2004 | Williams | |

(Continued)

FOREIGN PATENT DOCUMENTS

DE    4409224 A1    10/1994
WO    2008/016537 A2    2/2008

*Primary Examiner* — Kevin Hurley (74) *Attorney, Agent, or Firm* — Kenealy Vaidya LLP (57) ABSTRACT

A vehicle drivetrain can include a primary pair of drive wheels and a secondary pair of drive wheels and can be selectively switched between a two-wheel drive mode and a four-wheel drive mode. When the drivetrain is in the two-wheel drive mode, the secondary pair of wheels are disconnected from the prime mover and the multi-ratio transmission. Also, when the drivetrain is in the two-wheel drive mode, the components used to drive the secondary pair of drive wheels can be rotationally isolated from each of the secondary pair of wheels, the prime mover and the multi-ratio transmission.

15 Claims, 3 Drawing Sheets

(56) References Cited

U.S. PATENT DOCUMENTS

| | | |
|---|---|---|
| 6,699,151 B2 * | 3/2004 | Grogg et al. .................. 475/88 |
| 6,725,989 B1 | 4/2004 | Krisher et al. |
| 6,814,682 B2 | 11/2004 | Spitale |
| 6,817,434 B1 * | 11/2004 | Sweet .......................... 180/245 |
| 6,848,555 B2 | 2/2005 | Sakata et al. |
| 6,942,592 B1 | 9/2005 | Haka |
| 7,004,874 B2 | 2/2006 | Mizon et al. |
| 7,021,445 B2 | 4/2006 | Brissenden et al. |
| 7,062,984 B2 | 6/2006 | Haka |
| 7,086,987 B2 | 8/2006 | Janson et al. |
| 7,136,735 B2 | 11/2006 | Carlson et al. |
| 7,217,209 B2 | 5/2007 | Saito et al. |
| 7,343,998 B2 | 3/2008 | Morin et al. |
| 7,349,776 B2 | 3/2008 | Spillane et al. |
| 7,442,148 B2 | 10/2008 | Eckle et al. |
| 7,455,134 B2 | 11/2008 | Severinsky et al. |
| 7,458,917 B2 | 12/2008 | Yoshikawa et al. |
| 7,549,497 B2 | 6/2009 | Homan et al. |
| 7,678,003 B2 | 3/2010 | Janson et al. |
| 2002/0155916 A1 | 10/2002 | Brown et al. |
| 2003/0211913 A1 | 11/2003 | Spitale |
| 2004/0029673 A1 | 2/2004 | Lipman |
| 2004/0099459 A1 | 5/2004 | Nakasako et al. |
| 2005/0004732 A1 | 1/2005 | Berry et al. |
| 2006/0111823 A1 | 5/2006 | Tamai |
| 2007/0010927 A1 | 1/2007 | Rowley et al. |
| 2007/0016351 A1 | 1/2007 | Allen et al. |
| 2007/0049451 A1 | 3/2007 | Mizon et al. |
| 2007/0093347 A1 | 4/2007 | Janson et al. |
| 2007/0096557 A1 | 5/2007 | Tamai et al. |
| 2007/0219695 A1 | 9/2007 | Chiu et al. |
| 2007/0281823 A1 | 12/2007 | Hun |
| 2007/0299581 A1 | 12/2007 | Torralbo et al. |
| 2008/0046158 A1 | 2/2008 | Carey et al. |
| 2009/0032359 A1 | 2/2009 | Asano |
| 2009/0032360 A1 | 2/2009 | Asano |
| 2009/0099762 A1 | 4/2009 | Heinzmann et al. |

* cited by examiner

DRIVETRAIN FOR A VEHICLE AND METHOD OF CONTROLLING SAME

BACKGROUND

1. Field

The presently disclosed subject matter relates to devices, systems, and processes useful as a vehicle drivetrain that can includes a primary drivetrain and a secondary drivetrain. The secondary drivetrain can be selectively coupled to the primary drivetrain to provide an on-demand all-wheel-drive drivetrain.

2. Description of the Related Art

Vehicles are typically driven by two wheels, where the remaining wheels (typically two in number, but can be three, four or more) are idle. These two-wheel-drive (2WD) vehicles can be configured either as a front-wheel-drive (FWD) vehicle or a rear-wheel-drive vehicle (RWD). Existing two-wheel-drive (2WD) drivetrains can be supplemented with an on-demand all-wheel-drive (AWD) mode where the idle wheels are driven in addition to the wheels driven in the 2WD mode. That is, in a FWD vehicle, the rear wheels are added to the drive when the drivetrain is in the AWD mode. Likewise, in a RWD vehicle, the front wheels are added to the drive when the drivetrain is in the AWD mode. The AWD mode can be used to increase traction under certain conditions, such as snow, rain, mud, gravel, inclined driving surface and towing. The drivetrain of the vehicle can be switched manually by the driver, or automatically, between the 2WD mode and the AWD mode, as needed.

The fuel economy of a vehicle with an on-demand AWD mode can be less than a similar model of vehicle that is configured with only a 2WD drivetrain. The decrease in fuel economy can be a result of an increase in vehicle weight due to the components of the secondary drivetrain. The decrease in fuel economy can also be a result of an increase in rolling resistance due to rotational inertia and parasitic losses associated with the secondary drivetrain components, even when the drivetrain is in the 2WD mode. In vehicles having known 2WD drivetrains with an on-demand AWD mode, certain secondary drivetrain components (such as a propeller shaft, a plurality of bevel gears, and associated bearings) might be driven either by the engine/transmission or by the idling rear wheels when the vehicle is in the 2WD mode. Thus, the vehicle can experience a decrease in fuel economy when the vehicle is in 2WD mode as compared to a similar model of the vehicle that is configured only with a 2WD drivetrain.

Accordingly, there is a desire to improve the fuel economy, lower component costs, and improve general operational efficiency of a vehicle having a 2WD mode and an AWD mode.

SUMMARY

According to one aspect of the disclosure a drivetrain for a vehicle can include a pair of front wheels configured to rotate about a front axis that extends in a transverse direction of the vehicle. A pair of rear wheels can be spaced from the pair of front wheels in a longitudinal direction of the vehicle, wherein the longitudinal direction is perpendicular to the transverse direction. A front drive assembly can include a front drive gear and a front differential assembly rotationally connected to the front drive gear and each wheel of the pair of front wheels, wherein each of the front drive gear and the front differential assembly is configured to rotate about the front axis, and the front differential is intermediate the pair of front wheels. An on-demand drive assembly can be switchable between a FWD mode and an AWD mode, wherein when the on-demand drive assembly is in the FWD mode, the front drive gear is rotationally connected to the pair of front wheels and the front drive gear is rotationally disconnected from the pair of rear wheels, and wherein when the on-demand drive assembly is in the AWD mode, the front drive gear is rotationally connected to the pair of front wheels and at least one of the pair of rear wheels. The on-demand drive assembly can include a rear gear assembly connected intermediate the pair of rear wheels, a first rear clutch intermediate the rear gear assembly and one of the pair of rear wheels, wherein the first rear clutch rotationally disconnects the one of the pair of rear wheels from the rear gear assembly when the on-demand drive assembly is in the FWD mode and the first rear clutch rotationally connects the one of the pair of rear wheels to the rear gear assembly when the on-demand drive assembly is in the AWD mode, and a second rear clutch intermediate the rear gear assembly and another one of the pair of rear wheels, wherein the second rear clutch rotationally disconnects the another one of the pair of rear wheels from the rear gear assembly when the on-demand drive assembly is in the FWD mode. The on-demand drive assembly can include a power-take-off drive assembly located intermediate the rear gear assembly and the front drive assembly, the power-take-off drive assembly including a first gear engaging the front drive gear and configured to rotate about an axis substantially parallel to the transverse direction, a second gear configured to rotate about an axis substantially parallel to the transverse direction, a propeller shaft configured to rotate about an axis substantially parallel to the longitudinal direction, the propeller shaft including a front end connected to the second gear and a rear end connected to the rear gear assembly, and a power-take-off clutch intermediate the first gear and the second gear, wherein the power-take-off clutch is configured to rotationally disconnect the second gear from the front drive gear when the on-demand drive assembly is in the FWD mode and the power-take-off clutch is configured to rotationally connect the second gear to the front drive gear when the on-demand drive assembly is in the AWD mode.

According to another aspect of the disclosed subject matter, a drivetrain for a vehicle can include a drive assembly, a first pair of wheels, a second pair of wheels, and an on-demand drive assembly. The drive assembly can include a drive gear and a differential assembly connected to the drive gear. The first pair of wheels can be connected to the differential assembly. The second pair of wheels can be spaced from the first pair of wheels in a longitudinal direction of the vehicle. The on-demand drive assembly can be switchable between a two-wheel-drive mode and an AWD mode, wherein when the on-demand drive assembly is in the two-wheel-drive mode, the drive gear can be connected to the first pair of wheels and the drive gear can be disconnected from the second pair of wheels, and wherein when the on-demand drive assembly is in the AWD mode, the drive gear can be connected to the first pair of wheels and at least one of the second pair of wheels. The on-demand drive assembly can include a gear housing, an input gear, an output gear, a first clutch, a second clutch, and a power-take-off assembly. The gear housing can be intermediate the second pair of wheels. The input gear can be mounted in the gear housing and can rotate about an axis substantially parallel to the longitudinal direction. The output gear can be mounted in the gear housing and can rotate about an axis substantially perpendicular to the longitudinal direction. The first clutch can be mounted in the housing intermediate the output gear and a first one of the second pair of wheels, wherein the first clutch can disconnect the first one of the second pair of wheels from the output gear when the on-demand drive assembly is in the two-wheeldrive mode and the first clutch can selectively connect the first one of the second pair of wheels to the output gear when the on-demand drive assembly is in the AWD mode. The second clutch can be mounted in the housing intermediate the output gear and a second one of the second pair of wheels, wherein the second clutch can disconnect the second one of the second pair of wheels from the output gear when the on-demand drive assembly is in the two-wheel-drive mode and the second clutch can selectively connect the second one of the second pair of wheels to the output gear when the on-demand drive assembly is in the AWD mode. The power-take-off drive assembly can be intermediate the input gear and the drive assembly and can include a first gear, a second gear, a propeller shaft, and a power-take-off clutch. The first gear can engage the drive gear. The second gear can be spaced from the first gear. The propeller shaft can include a first end connected to the second gear and a second end connected to the input gear of the on-demand drive assembly. The power-take-off clutch can be intermediate the first gear and the second gear, wherein the power-take-off clutch can disconnect the second gear from the drive gear when the on-demand drive assembly is in the two-wheel-drive mode and the power-take-off clutch can connect the second gear to the drive gear when the on-demand drive assembly is in the AWD mode.

According to yet another aspect of the disclosed subject matter, a method for controlling a drivetrain of a vehicle having a FWD mode where only a front pair of wheels propel the vehicle and an AWD mode where the front pair of wheels and a rear pair of wheels propel the vehicle, the method can include: providing a drive assembly connected to the front pair of wheels in each of the FWD mode and the AWD mode, and an on-demand assembly intermediate the drive assembly and the rear pair of wheels and selectively connected to each of the drive assembly and the second pair of wheels; selecting one of the FWD mode and the AWD mode; connecting the on-demand assembly to each of the drive assembly and at least one of the rear pair of wheels when the AWD mode is selected; and rotationally isolating the on-demand assembly from each the drive assembly and the rear pair of wheels when the FWD mode is selected.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
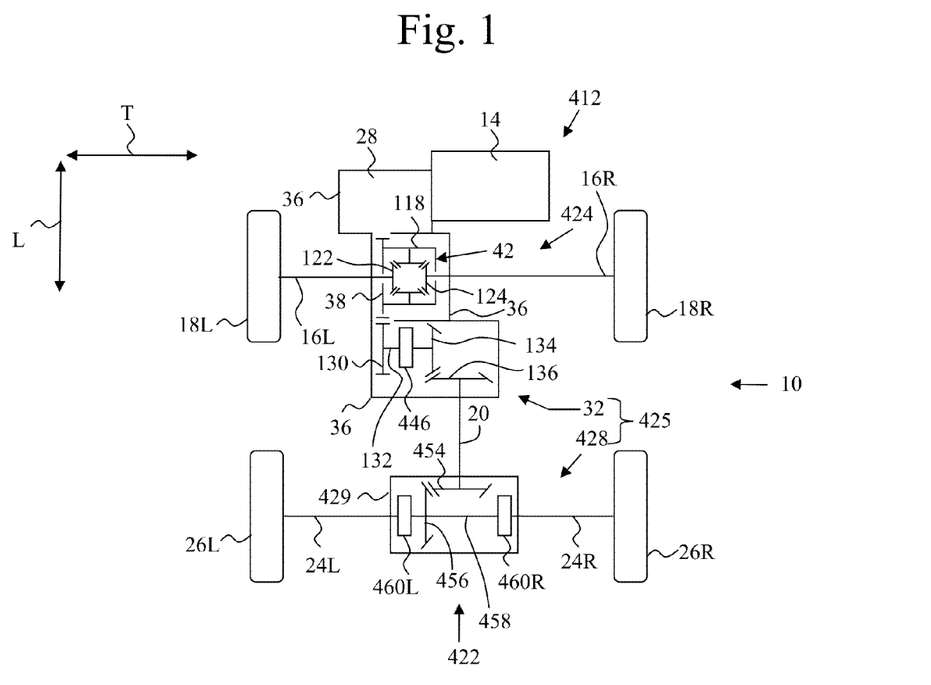
FIG. 1 is a schematic representation of a vehicle in accordance with the disclosed subject matter.

FIG. 1 illustrates an embodiment of a vehicle 10 made in accordance with principles of the disclosed subject matter.

The vehicle 10 can include a powertrain 412 that is configured as a FWD powertrain with an on-demand AWD mode. That is, under normal conditions, the powertrain 412 can operate in a FWD mode where only the front wheels 18L, 18R propel the vehicle 10, and the rear wheels 26L, 26R are free to rotate as the vehicle 10 travels. Under selective conditions, the powertrain 412 can operate in the AWD mode where the front wheels 18L, 18R and the rear wheels 26L, 26R, together, propel the vehicle 10. The powertrain 412 can include a prime mover or power source 14, a multi-ratio transmission 28, and a drivetrain 422. The power source 14 and the multi-ratio transmission 28 can be oriented in a transverse direction T, as is known in the art.

The power source 14 can be an internal combustion engine. Alternatively, the power source 14 can include an internal combustion engine and an electric motor configured as a hybrid system, as is known in the art. In another example, the power source 14 can include only an electric motor. Other exemplary power sources 14 can also be used, such hydrogen (fuel) cells, and other power sources.

The multi-ratio transmission 28 can be selectively connected to the power source 14 in any manner known in the art. The multi-ratio transmission 28 can include a discrete number of forward drive ratios and a reverse drive ratio, which can be selected manually by an operator of the vehicle 10 or automatically, as is known in the art. U.S. Pat. No. 4,974,473, the entirety of which is incorporated herein by reference, discloses an example of a conventional automatically selected transmission that has a plurality of discrete forward drive ratios and a reverse drive ratio.

Alternatively, the multi-ratio transmission 28 can include a plurality of forward drive ratios that can be varied continuously within the multi-ratio transmission 28 between a minimum drive ratio and a maximum drive ratio. The continuously variable multi-ratio transmission can also include a reverse drive ratio. U.S. Pat. No. 7,217,209, the entirety of which is incorporated herein by reference, discloses an example of a continuously variable multi-ratio transmission.

The drivetrain 422 can include a front drive assembly 424 and an on-demand drive assembly 425. The on-demand drive assembly 425 can include a power-take-off drive assembly 32 and a rear drive assembly 428. The multi-ratio transmission 28, a portion of the front drive assembly 424 and a portion of the power-take-off drive assembly 32 can be integrated within a common housing 36 to define a transaxle. FIG. 1 schematically represents such a transaxle.

When the powertrain 412 is in the FWD mode, only the front drive assembly 424 can be driven by the power source 14 and the multi-ratio transmission 28. In this FWD mode, a substantial majority of the components of the power-take-off drive assembly 32 and the rear drive assembly 428 can be rotationally isolated from the power source 14 and the multi-ratio transmission 28, as will be explained further.

The front drive assembly 424 can include an exemplary front drive gear such as, but not limited to, a front final drive gear 38. The front drive assembly 424 can include a front differential assembly 42 and a pair of front driveshafts 16L, 16R. The front final drive gear 38 can engage an output gear (not shown) of the multi-ratio transmission 28 so that the power source 14 can drive the front final drive gear 38 via the multi-ratio transmission 28.

The front differential assembly 42 can include an input member 118, a first output structure 122 and a second output structure 124. The input member 118 can engage the front final drive gear 38. The input member 118 can also be configured to drive one of the first output structure 122 and the second output structure 124 independent of the other of the first output structure 122 and second output structure 124 in any manner known in the art. The first output structure 122 can be connected to the left-side front driveshaft 16L to rotate in unison with the left-side front driveshaft 16L. The second output structure 124 can be connected to the right-side front driveshaft 16R to rotate in unison with the right-side front driveshaft 16R. The front wheels 18L, 18R can be connected to respective front driveshafts 16L, 16R to rotate in unison with the respective front driveshafts 16L, 16R.

The front differential assembly 42 can be an open-type differential assembly or a limited-slip-type differential assembly, as is known in the art. The front differential assembly 42 can include a planetary gear assembly, a viscous coupling assembly, a friction clutch assembly, or any combination of these assemblies, as is known in the art.

The power-take-off drive assembly 32 can include a first gear, second gear, a third gear a power-take-off shaft 132, a power-take-off clutch 446 and a propeller shaft 20. An exemplary first gear can be an input gear 130. An exemplary second gear can be an intermediate gear 134. An exemplary third gear can be an output gear 136. The input gear 130 can engage the front final drive gear 38. The power-take-off clutch 446 can selectively couple the intermediate gear 134 to the input gear 130, as will be described with reference to FIGS. 2 and 3. The intermediate gear 134 can engage the output gear 136. The propeller shaft 20 can extend substantially parallel to a longitudinal direction L from a front end of the propeller shaft 20 to the rear end of the propeller shaft 20. The front end of propeller shaft 20 can be connected to the output gear 136 to rotate in unison with the output gear 136 and the rear end of propeller shaft 20 can be connected to the rear drive assembly 428.

The intermediate gear 134 and output gear 136 can each be bevel gears to accommodate the orientation of the rotational axis of the propeller shaft 20, which is substantially parallel to the longitudinal direction L. The rotational axes of the input and intermediate gears 130, 134 can be substantially parallel to the transverse direction T, which is perpendicular to the longitudinal direction L. In an exemplary embodiment, the intermediate gear 134 and the output gear 136 can be hypoid bevel gears.

The rear drive assembly 428 can include a gear housing 429, a rear gear assembly, an intermediate shaft 458, a pair of rear clutches 460L, 460R and a pair of rear driveshafts 24L, 24R. The rear gear assembly can include an input gear 454 and a final drive gear 456. The input gear 454 can be connected to the rear end of the propeller shaft 20. The rear final drive gear 456 can engage the input gear 454. The intermediate shaft 458 can be connected to the rear final drive gear 456 to rotate in unison with the rear final drive gear 456. A first rear clutch 460L and a second rear clutch 460R can selectively couple the respective rear driveshafts 24L, 24R to the intermediate shaft 458, as will be described in detail with reference to FIG. 4. Alternatively, 460R could be referred to as the first rear clutch where 460L refers to the second rear clutch. The pair of rear driveshafts 24L, 24R can be connected to the pair of rear wheels 26L, 26R, respectively, to rotate in unison with the respective rear wheel 26L, 26R.

The input gear 454 and rear final drive gear 456 can each be bevel gears to accommodate the rotational axis of the intermediate shaft 458, which is substantially parallel to the transverse direction T and substantially perpendicular to the rotational axis of the propeller shaft 20. In an exemplary embodiment, the input gear 454 and the rear final drive gear 456 can be hypoid bevel gears.

The rear clutches 460L, 460R can be independently controlled to provide a differential drive function to the rear drive assembly 428 when the power-take-off clutch 446 is in the on-demand position. That is, selective actuation of each of the rear clutches 460L, 460R can permit one of the rear wheels 26L, 26R to be driven relative to the other of the rear wheels 26L, 26R by the power source 14 and the multi-ratio transmission 28. Such operation is known in the art and can be exemplified by U.S. Pat. No. 6,105,703, the entirety of which is incorporated herein by reference.

Under normal operating conditions for the vehicle 10, the drivetrain 422 can be in the FWD mode. In the FWD mode, the front wheels 18L, 18R can be driven by the power source 14 and the multi-ratio transmission 28, and the rear wheels 26L, 26R can be rotationally isolated from the power source 14 and the multi-ratio transmission 28.

The power-take-off clutch 446 and the pair of rear clutches 460L, 460R can cooperate to minimize the fuel consumption for the vehicle 10 when the drivetrain 422 is in the FWD mode. In particular, the power-take-off clutch 446 can rotationally isolate the on-demand drive assembly 425 (except the input gear 130) and the pair of rear wheels 26L, 26R from the power source 14 by disconnecting the intermediate gear 134 from the input gear 130. The pair of rear clutches 460L, 460R can rotationally isolate the intermediate shaft 458 from the rear wheels 26L, 26R by disconnecting the rear driveshafts 24L, 24R from the intermediate shaft 458. As a result, the intermediate gear 134, the output gear 136, the propeller shaft 20, the input gear 454, the rear final drive gear 456 and the intermediate shaft 458 can be rotationally isolated when the drivetrain 422 is in the FWD mode while the rear wheels 26L, 26R freely rotate with the movement of the vehicle 10. Because these components are rotationally isolated, the rolling resistance (due to rotational inertia and parasitic losses) of the vehicle 10 can more closely approximate that of a FWD-only model of the vehicle 10 when the drivetrain 422 is in the FWD mode. This can provide improvements, such as in the fuel economy, performance, and efficiency of the vehicle 10 when the drivetrain 422 is in the FWD mode.

Figure 2:
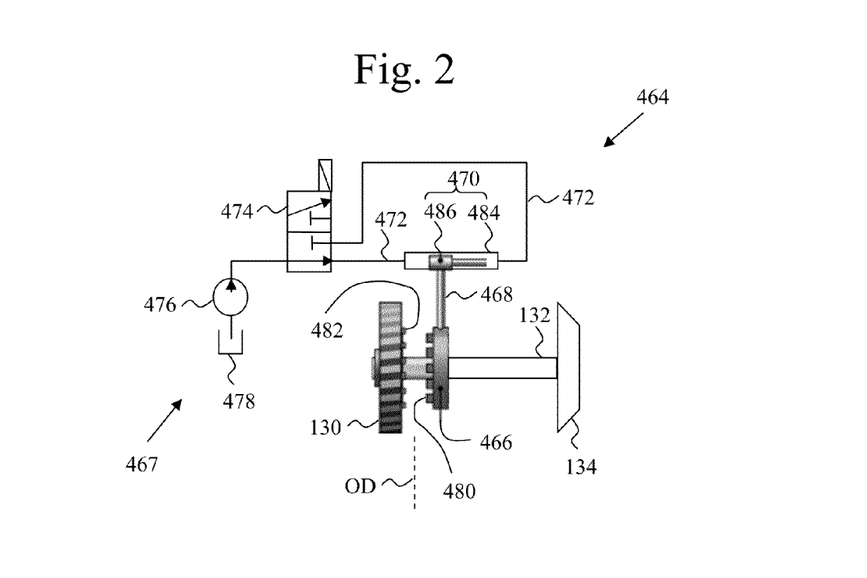
FIG. 2 is a schematic representation of a first example of an on-demand clutch made in accordance with principles of the disclosed subject matter.

The power-take-off clutch 446 of FIG. 1 can be configured as a hydraulically actuated clutch assembly 464, as illustrated schematically in FIG. 2. In this exemplary embodiment, the input gear 130 can be mounted for rotation with respect to the power-take-off shaft 132. The intermediate gear 134 can be connected to the power-take-off shaft 132 so that the intermediate gear 134 can rotate in unison with the power-take-off shaft 132.

The hydraulically actuated clutch assembly 464 can include a dog clutch 466 and a hydraulically controlled actuator assembly 467. The hydraulically controlled actuator assembly 467 can include a shift fork 468, an actuator 470, a conduit 472 in fluid communication with the actuator 470, a control valve 474 in fluid communication with the conduit 472, a pump 476 in fluid communication with the control valve 474 and a reservoir 478 in fluid communication with the pump 476.

The dog clutch 466 can be connected to the power-take-off shaft 132 in any manner known in the art such that the dog clutch 466 can move along the power-take-off shaft 132 between an idle position (shown) and an on-demand position (indicated by the dotted line OD). at which the dog clutch 466 can cause the power-take-off shaft 132 to rotate in unison with the dog clutch 466. For example, the dog clutch 466 can be connected to the power-take-off shaft 132 by a plurality of axial splines (not shown).

The dog clutch 466 can be in the on-demand position when the drivetrain 422 is in the AWD mode. When the dog clutch 466 is in the on-demand position, the intermediate gear 134 can be rotationally connected to the input gear 130 via the dog clutch 466. The dog clutch 466 can include teeth 480 on a face opposing the input gear 130, and the input gear 130 can include teeth 482 on a face opposing the dog clutch 466 that can engage the dog clutch teeth 480 when the dog clutch 466 is in the on-demand position OD. These teeth 480, 482 can be configured in any manner known in the art.

This engagement can transfer rotation of the input gear 130, caused by the power source 14 and the multi-ratio transmission 28, to the intermediate gear 134 via dog clutch 466 and the power-take-off shaft 132. The torque from the power source 14 and multi-ratio transmission 28 can then be transmitted to the rear drive assembly 428 via the output gear 136 and the propeller shaft 20, and finally to the rear wheels 26L, 26R.

The dog clutch 466 can be in the idle position when the drivetrain 422 is in the FWD mode. When the dog clutch 466 is in the idle position, the intermediate gear 134 can be rotationally disconnected from the input gear 130. As shown in FIG. 2, when the dog clutch 466 is in the idle position, the dog clutch teeth 480 can be disengaged from the teeth 482 on the face of the input gear 130. Thus, the dog clutch 466 can rotationally isolate the intermediate gear 134, the output gear 136, the propeller shaft 20, the rear drive assembly 428 and the rear wheels 26L, 26R from the power source 14 and the multi-ratio transmission 28 when the drivetrain is in the FWD mode.

Movement of the dog clutch 466 between the idle position and the on-demand position OD can be controlled hydraulically via the shift fork 468 and the actuator 470. The shift fork 468 can be connected to the dog clutch 466 and the actuator 470.

The actuator 470 can include a cylinder 484 and a piston 486 mounted to reciprocate within the cylinder 484. The piston 486 can move within the cylinder 484 between an idle position and an on-demand position that can correspond to the idle position and the on-demand position OD of the dog clutch 466, respectively.

The actuator 470 can be in fluid communication with the pump 476 via the control valve 474 and the conduit 472. The position of the control valve 474 can determine which side of the piston 486 is pressurized with fluid supplied by the pump 476 so that the piston 486, and consequently the dog clutch 466, can be moved to an appropriate one of the idle position and the on-demand position OD. The control valve 474 can be controlled automatically by an electronic control unit (not shown) in any manner known in the art. Alternatively, the control valve 474 can be controlled manually by the driver, either electrically via an electric switch or through a mechanical linkage in any manner known in the art. The pump 476 can be the pump used to control the multi-ratio transmission 28 or the pump 476 can be a dedicated pump used exclusively by the hydraulically actuated clutch assembly 464.

Figure 3:
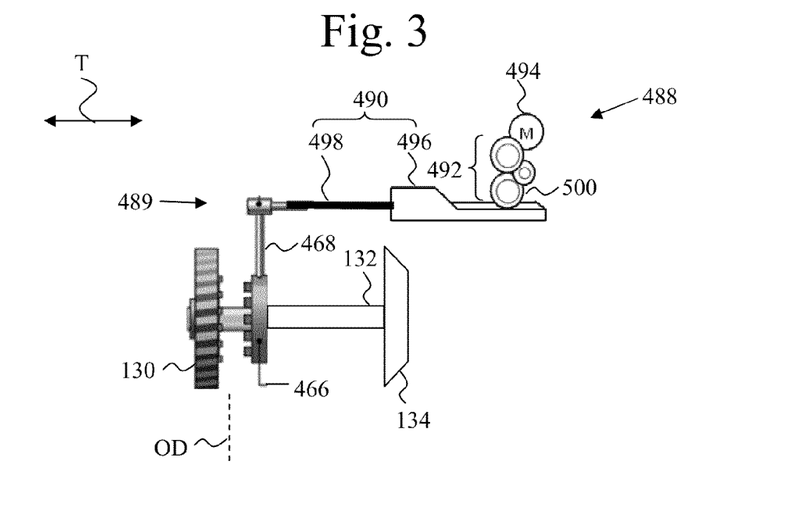
FIG. 3 is a schematic representation of a second example of an on-demand clutch made in accordance with principles of the disclosed subject matter.

FIG. 3 illustrates another exemplary embodiment of the power-take-off clutch 446 schematically represented in FIG. 1. In this example, the power-take-off clutch 446 can be configured as an electrically actuated clutch assembly 488, as illustrated schematically in FIG. 3. The electrically actuated clutch assembly 488 can include a dog clutch 466 and an electrically controlled actuator assembly 489. The electrically controlled actuator assembly 489 can include a shift fork 468. The dog clutch 466 and the shift fork 468 can be identical to those discussed above with reference to FIG. 2. Also, the structure and connections of the input gear 130, the power-take-off shaft 132 and the intermediate gear 134 can be identical to those described for the exemplary embodiment represented in FIG. 2.

The electrically controlled actuator assembly 489 can also include an actuator 490, a geartrain 492 and an electric motor 494. The actuator 490 can be connected to the shift fork 468 and the geartrain 492. The geartrain 492 can be driven by the electric motor 494. The electric motor 494 can be controlled automatically by an electronic control unit (not shown) in any manner known in the art. Alternatively, the electric motor 494 can be controlled manually by the driver through an electrical switch (not shown) in any manner known in the art.

The actuator 490 can include a rack 496 and a connecting rod 498. The geartrain 492 can include a pinion 500 driven by electric motor 494 via the remainder of the geartrain 492. The electric motor 494 can thus drive the geartrain 492.

The geartrain 492 can drive the rack 496 via the pinion 500 in the transverse direction T between an idle position and an on-demand position which can correspond to the idle position and the on-demand position, respectively, of the dog clutch 466.

In the exemplary embodiments of FIGS. 2 and 3, the power-take-off shaft 132 can be selectively coupled via the dog clutch 466 to rotate in unison with the input gear 130 and the intermediate gear 134 can be connected to the power-take-off shaft 132 to rotate in unison with the power-take-off shaft 132. However, it is possible to connect the input gear 130 to the power-take-off shaft 132 to rotate in unison with the power-take-off shaft 132 and to mount the intermediate gear 134 in the housing 36 to rotate relative to the power-take-off shaft 132. In this alternate arrangement, the teeth of the dog clutch 466 can interact with teeth formed on the intermediate gear 134 to selectively couple the intermediate gear 134 to the power-take-off shaft 132.

Figure 4:
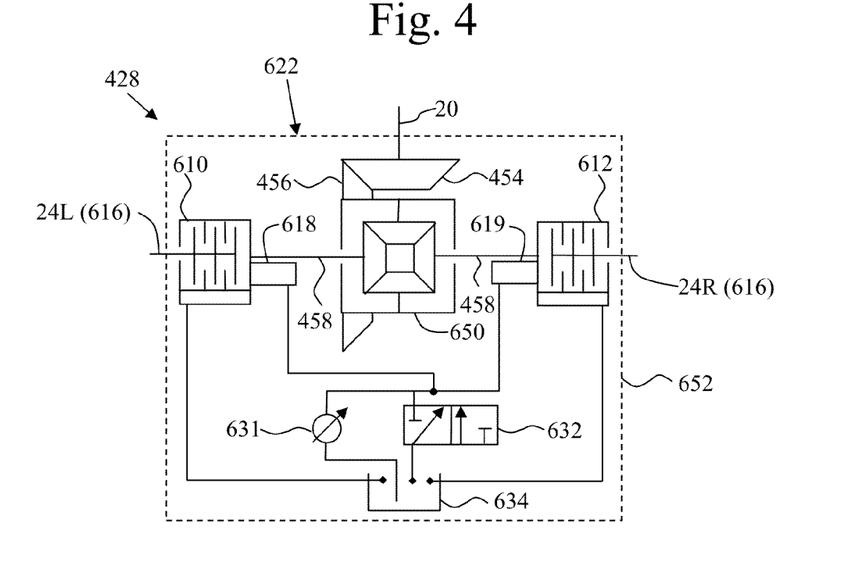
FIG. 4 is a schematic diagram of the rear differential assembly that includes a hydraulic vehicle clutch system made in accordance with principles of the disclosed subject matter.

FIG. 4 schematically illustrates the rear drive assembly 428 configured to include a hydraulic vehicle clutch system incorporated into a rear differential assembly 622. Co-pending U.S. patent application Ser. No. 12/847,786, entitled "Hydraulic Vehicle Clutch System, Drivetrain for a Vehicle Including Same, and Method", filed concurrently herewith and incorporated in its entirety herein by reference discloses details of the rear differential assembly 622. Only the clutches 610, 612, the actuators 618, 619, the on-demand variable displacement pump 631, the purge valve 632, the reservoir 634 and the fluid lines are illustrated, with the remainder of the clutch system 601 omitted for clarity. It should be noted that the rear differential assembly 622 can include a pump motor, pressure sensor(s), an ECU, a pump control unit, and other structures, all of which have been omitted from FIG. 4 for clarity.

The ECU (not illustrated) can signal the pump motor and/or the pump 631 and/or the purge valve to reduce the pressure to the clutches 610, 612 so that torque from the propeller shaft 20 is not transmitted to the rear driveshafts 24L, 24R. Thus, the component isolation described above can be achieved. When the AWD mode is desired, the ECU can signal the pump motor and/or the pump 631 and/or the purge valve to modulate the pressure to the clutches 610, 612 so that torque from the propeller shaft 20 can be transmitted to the rear driveshafts 24L, 24R.

In FIG. 4, the rear differential assembly 622 is illustrated with a planetary gear assembly 650. The planetary gear assembly 650 can be an open-type differential assembly or a limited-slip-type differential assembly, as is known in the art. Alternatively, the planetary gear assembly 650 can be omitted and the clutches 610, 612 can be modulated by the ECU through the pump motor, the pump 631, and the purge valve 632 to permit differential speed output for each of the rear driveshafts 24, 24R. Above-referenced U.S. Pat. No. 6,105,703 discloses an exemplary modulation of clutches that can permit differential speed output for each of a pair of rear driveshafts. A gear housing 652 (dotted line) can contain the planetary gear assembly 650, the clutches 610, 612, the input gear 454 and the rear final drive gear 456.

Figure 5:
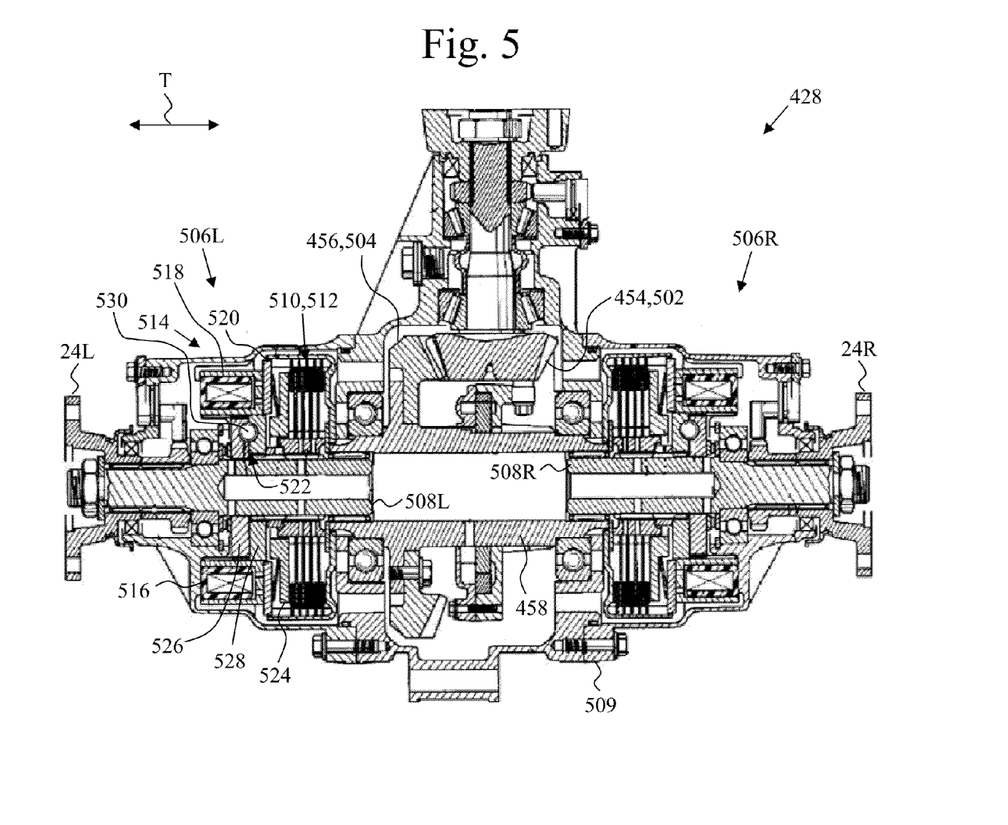
FIG. 5 is a cross-sectional view of a rear drive assembly made in accordance with principles of the disclosed subject matter.

FIG. 5 illustrates a cross-sectional view of another exemplary embodiment of the rear drive assembly 428. In this exemplary embodiment, the input gear 454 can be configured as a hypoid bevel pinion gear 502 and the rear final drive gear 456 can be configured as a hypoid bevel crown gear 504. The rear clutches 460L, 460R of FIG. 1 can be configured as electromagnetically actuated clutch assemblies 506L, 506R. The rear drive shafts 24L, 24R can include respective half shafts 508L, 508R. Each of the electromagnetically actuated clutch assemblies 506L, 506R can selectively couple a respective one of the half shafts 508L, 508R to the intermediate shaft 458 when the power-take-off clutch 446 (FIG. 1) couples the intermediate gear 134 to the input gear 130. The electromagnetically actuated clutch assemblies 506L, 506R can rotationally isolate the half shafts 508L, 508R from the intermediate shaft 458 when the drivetrain 422 (FIG. 1) is in the FWD mode. Thus, when the drivetrain 422 (FIG. 1) is in the FWD mode, the rear wheels 26L, 26R can only drive the half shafts 508L, 508R as the vehicle 10 travels.

As disclosed above, the power-take-off clutch 446 and the rear clutches 460L, 460R can cooperate to rotationally isolate the intermediate gear 134, the output gear 136, the propeller shaft 20, the input gear 454, the rear final drive gear 456 and the intermediate shaft 458 from each of the power source 14, the multi-ratio transmission 28 and the rear wheels 26L, 26R. Accordingly, the rolling resistance (due to rotational inertia and parasitic losses) of the vehicle 10 can more closely approximate that of a FWD-only model of the vehicle 10 when the drivetrain 422 is in the FWD mode.

The rear drive assembly 428 can include a gear housing such as, but not limited to, a rear drive housing 509. The rear drive housing 509 can support the hypoid bevel pinion gear 502, the hypoid bevel crown gear 504, the electromagnetically actuated clutch assemblies 506L, 506R and the half shafts 508L, 508R.

U.S. Pat. No. 6,105,703 referenced above discloses electromagnetically clutch assemblies that can be used in the rear drive assembly 428 to selectively connect the pair of rear wheels 26L, 26R to the power source 14 and multi-ratio transmission 28.

Explanation of the electromagnetically actuated clutch assemblies 506L, 506R is provided with reference to the left-side electromagnetically actuated clutch assembly 506L. The left-side electromagnetically actuated clutch assembly 506L can include a first set of clutch plates 510, a second set of clutch plates 512 and an electromagnetic actuator 514. The first set of clutch plates 510 can be connected to the intermediate shaft 458 to rotate in unison with the intermediate shaft 458. The second set of clutch plates 512 can be connected to the left-side half shaft 508L to rotate in unison with the left-side half shaft 508L. The first set of clutch plates 510 can be interleaved with the second set of clutch plates 512.

The electromagnetic actuator 514 can include a coil 516, a coil housing 518, an armature 520, a ball cam mechanism 522 and a clutch piston 524. The coil 516 can be connected to the rear drive housing 509. The armature 520 can be connected to the first set of clutch plates 510 to rotate in unison with the first set of clutch plates 510. The clutch piston 524 can be connected to the left-side half shaft 508L to rotate in unison with the left-side half shaft 508L and to move along the left-side half shaft 508L in the transverse direction T. The clutch piston 524 can engage the first set of clutch plates 510.

Ball cam mechanisms are known in the art and U.S. Pat. No. 6,105,703, referenced above, discloses an example of a ball cam mechanism. The ball cam mechanism 522 can include a first cam member 526, a second cam member 528 and a plurality of balls 530 captured therebetween. The opposing faces of the cam members 526, 528 can have cam profiles (not shown) on which the plurality of balls 530 can ride. When one of the cam members 526, 528 rotates relative to another one of the cam members 526, 528, the balls 530 can cause one of the cam members 526, 528 to move away from the other of the cam members 526, 528 in the transverse direction T.

The first cam member 526 can be mounted for rotation relative to the left-side half shaft 508L. The coil housing 518 can be connected to the first cam member 526 to rotate in unison with the first cam member 526. The second cam member 528 can be connected to the left-side half shaft 508L to rotate in unison with the left-side half shaft 508L.

When the coil 516 is de-energized, the coil housing 518 and the first cam member 526 can rotate in unison with the respective half shaft 508L, 508R due to the interaction of the plurality of balls 530 with the cam profiles on each of the cam members 526, 528, as is known in the art. Accordingly, the frictional contact between the first set of clutch plates 510 and the second set of clutch plates 512 can be a minimum so that the first set of clutch plates 510 can slip relative to the second set of clutch plates 512. As a result, the half shafts 508L, 508R can be rotationally isolated from the intermediate shaft 458.

When the coil 516 is energized, the coil 516 can generate a magnetic flux that can attract the armature 520 to the coil housing 518. The resultant attractive force can connect the armature 520 to the coil housing 518 to rotate the coil housing 518 in unison with the armature 520. The subsequent rotation of the coil housing 518 can rotate the first cam member 526 relative to the second cam member 528. This relative rotation can displace the clutch piston 524 in the transverse direction T towards the first set of clutch plates 510 and can modulate the frictional force generated between the each plate of the first set of clutch plates 510 and the second set of clutch plates 512. This resultant frictional force can rotationally couple the half shafts 508L, 508R to the intermediate shaft 458.

Thus, when the power-take-off clutch 446 couples the intermediate gear 134 to the input gear 130, the coil 516 can be energized to activate the AWD mode of the drivetrain 422. And, when the power-take-off clutch 446 disconnects the intermediate gear 134 from the input gear 130, the coil 516 can be de-energized to activate the FWD mode of the drivetrain 422.

Although the rear clutches 460L, 460R are shown to be contained within the rear drive housing 509 that also contains the input gear 454 and the rear final drive gear 456, the rear clutches 460L, 460R can be contained in respective housings separate from the rear drive housing 509.

While certain embodiments of the disclosed subject matter are described above, it should be understood that the disclosed subject matter can be embodied and configured in many different ways without departing from the spirit and scope of the disclosed subject matter. For example, the primary drive wheels can be the rear wheels and the secondary drive wheels can be the front wheels such that when the drivetrain is in a two-wheel-drive mode, the rear wheels are driven and the front wheels are idle. In this configuration, the prime mover and the multi-ratio transmission can be aligned along the longitudinal direction of the vehicle and the power-take-off assembly can include a transfer case, which is a component known in the art.

The amount and weight and types of components that can be isolated can vary according to specific applications and in accordance with those of skill in the transmission art. For example, transfer gearing, a propeller shaft, rear differential gearing, and a rear differential pump can all be isolated. This type of system may use hypoid gears, which are typically inefficient, and taper roller bearings, which are known to impart high drag on the system. These types of gears can be isolated using the principles of the disclosed subject matter.

In another alternative, instead of a dog clutch, the power-take-off clutch 446 can be configured as a viscous coupling, such as a magneto-rheological viscous coupling. In such a configuration, the power-take-off clutch 446 might not include a discrete idle position and a discrete on-demand position. Instead, the power-take-off clutch 446 could have a de-energized state where the power-take-off clutch rotationally isolates the intermediate gear 134 from the input gear 130. Similarly, the rear clutches 460L, 460R could be configured as magneto-rheological viscous couplings.

Co-pending U.S. patent application Ser. No. 12/847,639, entitled "Transversely Mounted Transaxle Having A Low Range Gear Assembly and Powertrain for A Vehicle Including Same", and Co-pending U.S. patent application Ser. No. 12/847,673, entitled "Control System and Method for Automatic Selection of Low Range Gear Ratio for Vehicle Drivetrain," are hereby incorporated in their entireties by reference.

While the subject matter has been described in detail with reference to exemplary embodiments thereof, it will be apparent to one skilled in the art that various changes can be made, and equivalents employed, without departing from the scope of the invention. All related art references discussed above are hereby incorporated by reference in their entirety.

What is claimed is:

1. A drivetrain for a vehicle comprising:
a pair of front wheels configured to rotate about a front axis that extends in a transverse direction of the vehicle;
a pair of rear wheels spaced from the pair of front wheels in a longitudinal direction of the vehicle, wherein the longitudinal direction is perpendicular to the transverse direction;
a front drive assembly including a front drive gear and a front differential assembly rotationally connected to the front drive gear and each wheel of the pair of front wheels, wherein each of the front drive gear and the front differential assembly is configured to rotate about the front axis, and the front differential is intermediate the pair of front wheels; and
an on-demand drive assembly switchable between a FWD mode and an AWD mode, wherein when the on-demand drive assembly is in the FWD mode, the front drive gear is rotationally connected to the pair of front wheels and the front drive gear is rotationally disconnected from the pair of rear wheels, and wherein when the on-demand drive assembly is in the AWD mode, the front drive gear is rotationally connected to the pair of front wheels and at least one of the pair of rear wheels, the on-demand drive assembly including,
a rear gear assembly connected intermediate the pair of rear wheels,
a first rear clutch intermediate the rear gear assembly and one of the pair of rear wheels, wherein the first rear clutch rotationally disconnects the one of the pair of rear wheels from the rear gear assembly when the on-demand drive assembly is in the FWD mode and the first rear clutch rotationally connects the one of the pair of rear wheels to the rear gear assembly when the on-demand drive assembly is in the AWD mode, and
a second rear clutch intermediate the rear gear assembly and another one of the pair of rear wheels, wherein the second rear clutch rotationally disconnects the another one of the pair of rear wheels from the rear gear assembly when the on-demand drive assembly is in the FWD mode; and
a power-take-off drive assembly located intermediate the rear gear assembly and the front drive assembly, the power-take-off drive assembly including,
a first gear engaging the front drive gear and configured to rotate about an axis substantially parallel to the transverse direction,
a second gear configured to rotate about an axis substantially parallel to the transverse direction,
a propeller shaft configured to rotate about an axis substantially parallel to the longitudinal direction, the propeller shaft including a front end connected to the second gear and a rear end connected to the rear gear assembly, and
a power-take-off clutch intermediate the first gear and the second gear, wherein the power-take-off clutch is configured to rotationally disconnect the second gear from the front drive gear when the on-demand drive assembly is in the FWD mode and the power-take-off clutch is configured to rotationally connect the second gear to the front drive gear when the on-demand drive assembly is in the AWD mode.

2. The drivetrain according to claim 1, wherein the power-take-off clutch includes,
a dog clutch rotationally connected to one of the first gear and the second gear when the on-demand drive assembly is in each of the FWD mode and the AWD mode, and the dog clutch is movable between an idle position and an on-demand position, wherein when the on-demand drive assembly is in the FWD mode the dog clutch is in the idle position and is disengaged from another one of the first gear and the second gear, and when the on-demand drive assembly is in the AWD mode the dog clutch is in the on-demand position and the dog clutch is engaged with the another one of the first gear and the second gear, and
an actuator connected to the dog clutch to move the dog clutch between the idle position and the on-demand position.

3. The drivetrain according to claim 2, wherein the actuator includes,
a pump,
a control valve in fluid communication with the pump,
a piston in fluid communication with the control valve, and
a connecting rod connected to each of the piston and the dog clutch.

4. The drivetrain according to claim 2, wherein the actuator includes,
an electric motor,
a plurality of gears,
a rack driven by the electric motor and the plurality of gears, and
a connecting rod connected to each of the rack and the dog clutch.

5. The drivetrain according to claim 2, wherein the dog clutch is connected to the second gear to rotate in unison with the second gear in each of the idle position and the on-demand position, the dog clutch is disconnected from the first gear when the dog clutch is in the idle position, and the dog clutch is connected to the first gear when the dog clutch is in the on-demand position.

6. The drivetrain according to claim 1, wherein the power-take-off drive assembly further includes a shaft rotating about an axis substantially parallel to the transverse direction, the second gear is connected to the shaft to rotate in unison with the shaft, and a dog clutch slides along the shaft between an idle position where the dog clutch rotationally disconnects the shaft from the first gear and an on-demand position where the dog clutch rotationally connects the shaft to the first gear.

7. The drivetrain according to claim 1, wherein the power-take-off drive assembly further includes a third gear engaging the second gear, the third gear being connected to the front end of the propeller shaft and configured to rotate about an axis substantially parallel to the longitudinal direction.

8. The drivetrain according to claim 1, wherein the rear gear assembly includes,
   an input gear connected to the rear end of the propeller shaft,
   a rear intermediate shaft, and
   an output gear connected to the rear intermediate shaft at a position intermediate each of the first rear clutch and second rear clutch, the output gear engaging the input gear,
   wherein the first rear clutch and second rear clutch selectively couple the intermediate shaft to the pair of rear wheels.

9. The drivetrain according to claim 8, wherein the on-demand drive assembly further includes,
   a pair of rear driveshafts connected to a respective one of the pair of rear wheels and selectively connected to the intermediate shaft by a respective one of the first rear clutch and the second rear clutch.

10. The drivetrain according to claim 9, wherein each of the first rear clutch and the second rear clutch includes,
    a first set of clutch plates connected to the rear intermediate shaft,
    a second set of clutch plates connected to a respective one of the pair of rear driveshafts, and
    at least one of an electromagnetic actuator and an hydraulic actuator that selectively engages the first set of clutch plates with the second set of clutch plates.

11. The drivetrain according to claim 1, wherein the first gear is configured to rotate about a common axis and the second gear and the power-take-off clutch are configured to rotate about the common axis, and the common axis is substantially parallel to the transverse direction.

12. The drivetrain according to claim 1, wherein the on-demand drive assembly further includes a gear housing, and the rear gear assembly, the first rear clutch, and the second rear clutch are mounted in the gear housing.

13. The drivetrain according to claim 1, wherein the second rear clutch rotationally connects the another one of the pair of rear wheels to the rear gear assembly when the on-demand drive assembly is in the AWD mode.

14. A method for controlling a drivetrain for a vehicle comprising:
    providing a drivetrain according to claim 1;
    selecting one of the FWD mode and the AWD mode;
    connecting the on-demand drive assembly to each of the front drive assembly and at least one of the pair of rear wheels when the AWD mode is selected; and
    rotationally isolating the on-demand drive assembly from each of the front drive assembly and the pair of rear wheels when the FWD mode is selected.

15. The method according to claim 14, wherein
    connecting includes,
      connecting the second gear to the front drive gear with the power-take-off clutch, and
      connecting the rear gear assembly to each of the pair of rear wheels with a respective one of the first rear clutch and the second rear clutch, and
    rotationally isolating includes,
      disconnecting the power-take-off clutch to substantially eliminate torque transfer between the front drive assembly and the second gear,
      disconnecting the first rear clutch to substantially eliminate torque transfer between the rear gear assembly and one of the pair of rear wheels, and
      disconnecting the third clutch to substantially eliminate torque transfer between the rear gear assembly and another one of the pair of rear wheels.

* * * * *